United States Patent [19]
Floryan et al.

[11] 3,994,859
[45] Nov. 30, 1976

[54] CATALYST REMOVAL FROM POLYPHENYLENE ETHER REACTION SOLUTIONS BY BISULFATE EXTRACTION

[75] Inventors: Daniel Edwin Floryan, Glenmont, N.Y.; Justin Walter Gucz, Pittsfield, Mass.

[73] Assignee: General Electric Company, Pittsfield, Mass.

[22] Filed: Apr. 1, 1975

[21] Appl. No.: 564,124

[52] U.S. Cl. .......................... 260/47 ET; 260/583 N
[51] Int. Cl.$^2$ .................. C08G 65/44; C08G 65/46
[58] Field of Search ..................... 260/47 ET, 583 N

[56]     References Cited
         UNITED STATES PATENTS

| | | | |
|---|---|---|---|
| 3,630,995 | 12/1971 | Modan | 260/47 ET |
| 3,783,147 | 1/1974 | Calicchia et al. | 260/47 ET |
| 3,838,102 | 9/1974 | Bennett et al. | 260/47 ET |

*Primary Examiner*—Lester L. Lee
*Attorney, Agent, or Firm*—William F. Mufatti; Edward A. Hedman

[57]          ABSTRACT

A novel process for the separation of catalyst residues from polyphenylene ether reaction systems is disclosed. The process is based on the discovery that an aqueous solution of a water soluble bisulfate will extract a complex copper-amine catalyst from a reaction solution of a polyphenylene ether resin.

11 Claims, No Drawings

CATALYST REMOVAL FROM POLYPHENYLENE ETHER REACTION SOLUTIONS BY BISULFATE EXTRACTION

This invention relates to a novel process for the separation of catalyst residues from polyphenylene ether reaction mixtures by the use of aqueous solutions of a water soluble bisulfate.

BACKGROUND OF THE INVENTION

The polyphenylene ethers and processes for their preparation are well known in the art. They are described in Hay, U.S. Pat. No. 3,306,874 and U.S. Pat. No. 3,306,875 and Blanchard et al, U.S. Pat. NO. 3,219,625 and U.S. Pat. No. 3,219,626 all of which are incorporated by reference. Other patents which show the preparation of polyphenylene ethers include Price et al, U.S. Pat. No. 3,382,212 and Kobayashi et al, U.S. Pat. No. 3,455,880 which are also incorporated by reference.

The processes most generally used to produce the polyphenylene ethers involve the self-condensation of a monovalent phenol in the presence of an oxygen-containing gas and a catalyst comprising a metal-amine complex.

These processes are carried out in the presence of an organic solvent and the reaction is usually terminated by removal of the catalyst from the reaction mixture.

Aqueous solutions of acids such as acetic acid, hydrochloric acid, and sulfuric acid, are generally the most efficient means of removing both the metal and amine components of catalyst residues of polyphenylene ether reactions. Organic acids, such as acetic acid, however, are less desirable for this purpose because of their relatively high cost and the difficulties involved in either disposing of them (environmental concern) or recovering them for reuse. Hydrochloric acid and sulfuric acid on the other hand, while less costly and more easily disposed of, are difficult to use because of their corrosive nature and because of their effects on the polyphenylene ether properties.

Use of hydrochloric acid generally results in incorporation of residual chloride in the polyphenylene ether which results in poor oxidative stability of the polymer.

Use of the aqueous solutions of sulfuric acid for extraction of copper-amine catalyst residues causes formation of emulsions with polyphenylene ether solutions which are difficult to separate. Sulfuric acid also is known to cause sulfonation of polyphenylene ethers. Were it not for these problems, and the problem of equipment corrosion, sulfuric acid would be a very attractive extraction agent for catalyst residues.

Chelating agents have also been employed for extraction of copper-amine catalyst residues. These materials are relatively efficient, but they are expensive and problems are encountered in the separation of residues for disposal purposes.

It has now been found that the use of bisulfate salt solutions in place of sulfuric acid eliminates these problems and permits efficient extraction of catalyst residue. Bisulfates are much less corrosive to stainless steel. (Samples of Carpenter type 316L Ht 46626 stainless steel in 10% sulfuric acid at 212° F showed 77% weight loss in 28 days, whereas the same material in 10% sodium bisulfate at 212° F showed only 3.8% weight loss in 29 days). The bisulfate solutions usually do not form emulsions with polyphenylene ether solutions, thus allowing easier phase separation. Also they are efficient in extracting the complex copper-amine catalyst.

Accordingly, it is a primary object of the present invention to provide an efficient process for separating a catalyst residue of polyphenylene ether resin from its reaction mixture which employs inexpensive relatively non-corrosive reagents.

DESCRIPTION OF THE INVENTION

This invention provides in a process for forming a polyphenylene ether by an oxidative coupling reaction in the presence of a complex copper-amine catalyst comprising passing an oxygen-containing gas through a reaction solution of a phenol and said catalyst, the improvement which comprises separating said catalyst by contacting the reaction solution with an aqueous solution of a water soluble bisulfate salt and thereafter separating the polyphenylene ether from the reaction mixture.

The preferred polyphenylene either resins are of the formula:

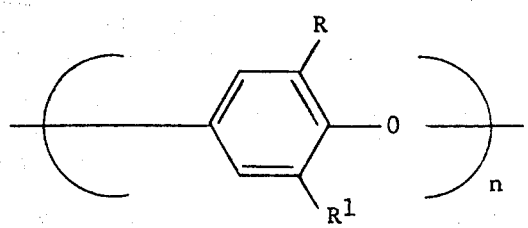

wherein the oxygen ether atom of one unit is connected to the benzene nucleus of the next adjoining unit, n is an integer of at least 50; and R and $R^1$ are monovalent substituents selected from hydrogen, halogen, hydrocarbon radicals, halohydrocarbon radicals having at least two carbon atoms between the halogen atom and the phenyl nucleus.

The preferred polyphenylene ether resin is poly(2,6-dimethyl1,4-phenylene ether).

The water soluble salt of a bisulfate may be any of the alkali metal bisulfates such as sodium, potassium or lithium bisulfate. Also, magnesium bisulfate or ammonium bisulfate may be employed.

It is preferred to employ solutions that contain from 1% w/w to a saturated solution of the water soluble bisulfate at 25°–40° C. Usually from 1–20% w/w may be employed. A sufficient quantity of the aqueous solution of the bisulfate is employed so that the molar ratio of the bisulfate compound to the amine component of the catalyst is from 1:1 to 10:1. Preferred ratios are about 1:1 to 2:1.

In the practice of the invention, the reaction solution is contacted with an aqueous solution of the bisulfate compound either batchwise or in a continuous manner. Thereafter, the organic reaction phase is separated from the aqueous bisulfate phase that contains the extracted catalyst. The extraction may be carried out by the use of conventional countercurrent liquid liquid extraction apparatus or it may be carried out in any vessel having suitable means for agitation and separation of the organic and aqueous phases. Decantation or other known methods may be employed to separate the aqueous phase from the organic phase. Thereafter, an antisolvent such as methanol may be added to the reaction mixture to precipitate the polymer according to known precedures.

DESCRIPTION OF THE PREFERRED EMBODIMENTS

EXAMPLE I

To a one (1) liter resin reactor fitted with a stainless steel cooling coil and a high speed agitator was added 500 ml toluene and 10.9 g di-n-butylamine (DBA). A solution of 0.25 g cupric chloride ($CuCl_2$) and 0.39 g sodium bromide (NaBr) in four (4) ml of methanol was added to the reactor from a beaker, followed by two (2) ml of methanol as a rinse. Oxygen ($O_2$) was added through a dip tube in the reactor at a rate of 120 cc/min. and a solution of 2,6-xylenol (70 g in 83 cc of toluene) was added slowly ofer 15 minutes through a dropping funnel. After 120 minutes (from the start of 2,6-xylenol addition) oxygen addition was ended. The polymer solution was quite viscous and a later determination of intrinsic viscosity showed 0.52 dl/g. Temperature was maintained at 30° C throughout the reaction.

After the reaction was completed the polymer solution was split into four portions and extracted with acids and sodium bisulfate as shown below, then precipitated with methanol to give residual copper levels as shown below:

1.* One Extraction at 2:1 Molar Ratio 5% Acetic Acid to Copper + DBA-4ppm Cu
2.* One Extraction at 2:1 Molar Ratio 10% $H_2SO_4$ to Copper + DBA-6ppm Cu
3. One Extraction at 2:1 Molar Ratio 25% $NaHSO_4$-$H_2O$ to Copper + DBA-4ppm Cu
4. One Extraction at 2:1 Molar Ratio 50% $NaHSO_4$-$H_2O$ to Copper + DBA-5ppm Cu
5. One Extraction at 1.1:1 Molar Ratio 10% $NaHSO_4$ to Copper + DBA-13 ppm Cu
6. One Extraction at 2:1 Molar Ratio 10% $NaHSO_4$ to Copper + DBA- 20 ppm Cu *control The polymer solution extracted with sulfuric acid was difficult to phase separate and remained cloudy. The other samples were easily phase separated and showed good recovery of copper and dibutyl amine in the aqueous phase.

COMPARATIVE EXAMPLE A

For comparison, a polymer solution prepared as in Example I was precipitated with methanol with no extraction of catalyst and amine residues. The residual copper level in the washed, dried polyphenylene ether was 382 ppm.

EXAMPLE II

A polymer solution prepared as in Example I was split into four portions. The portions were extracted with 10% sodium bisulfate monohydrate and precipitated with methanol to give residual copper levels as shown below:

7. One Extraction at 2:1 $NaHSO_4$:Cu + DBA- 24 ppm Cu
8. Two Extractions at 1:1 $NaHSO_4$:Cu + DBA -28 ppm Cu
9. Two Extractions at 0.75:1 $NaHSO_4$: Cu + DBA-28 ppm Cu
10. Three Extractions at 0.5:1 $NaHSO_4$: Cu + DBA- 30 ppm Cu Good copper and dibutyl amine recovery was obtained from the aqueous extracts. On centrifugation the clear polymer solution easily separated from the aqueous extracts.

EXAMPLE III

A polymer solution prepared as in Example I was split into four portions and each portion was extracted with sodium bisulfate monohydrate at different concentrations, all at twice the molar ratio of copper and dibutyl amine, and precipitated to give residual copper levels as shown below:

11. 1% $NaHSO_4$-$H_2O$- 5ppm Cu
12. 3% $NaHSO_4$-$H_2O$- 26 ppm Cu
13. 5% $NaHSO_4$-$H_2O$- 38 ppm Cu
14. 10% $NaHSO_4$-$H_2O$- 43 ppm Cu

EXAMPLE IV

This example demonstrates the importance of effective phase separation after extraction with sodium bisulfate solutions in order to effectively remove copper residues from the polyphenylene ether catalyzed with copper-amine. A polymer solution prepared as in Example I was split into three portions, all of which were extracted with 10% sodium bisulfate monohydrate at a molar ratio of 1.5 times the amount of copper and dibutyl amine. The samples were then treated as shown below to remove the aqueous bisulfate-copper extract and precipitated with methanol to give residual copper levels as shown below:

15. No centrifugation of aqueous extract — 314 ppm Cu
16. Centrifuged to remove aqueous extract — 7ppm Cu
17. Centrifuged, water washed, centrifuged — 7ppm Cu

EXAMPLE V

This example shows that sodium bisulfate extraction agents can be prepared by the addition of sodium sulfate to sulfuric acid solution. A polymer solution prepared as in Example I was split into four portions, and each portion was extracted with 10% sulfuric acid (at a molar ratio of 1.5 to 1 to copper and dibutyl amine) with various levels of sodium sulfate added as shown below. The polyphenylene ether was precipitated after centrifugation of the aqueous extract to give samples containing copper residues as shown below:

| | | |
|---|---|---|
| 18* | 10% $H_2SO_4$ Only | 55 ppm Cu |
| 19. | 10% $H_2SO_4$ with added 25 mole % $Na_2SO_4$ (based on $H_2SO_4$) | 53 ppm Cu |
| 20. | 10% $H_2SO_4$ with added 50 mole % $Na_2SO_4$ (based on $H_2SO_4$) | 52 ppm Cu |
| 21. | 10% $H_2SO_4$ with added 75 mole % $Na_2SO_4$ (based on $H_2SO_4$) | 5 ppm Cu |

*control

As the level of bisulfate in the sulfuric acid solution increased phase separation of the aqueous extract became easier and the polymer solution became clearer.

EXAMPLE VI

This example shows that the addition of increasing amounts of sodium sulfate to a sodium bisulfate extraction solution further aids in the ability to separate aqueous and organic phases. A polymer solution prepared as in Example I was split into four portions and each was extracted with 1.5 to 1 molar ratio 10% sodium bisulfate monohydrate with added amounts of sodium bisulfate was shown below:

| | | |
|---|---|---|
| 22. | 10% NaHSO$_4$-H$_2$O | 48 ppm Cu |
| 23. | 10% NaHSO$_4$-H$_2$O with 10% Na$_2$SO$_4$ (based on NaHSO$_4$-H$_2$O) | 51 ppm Cu |
| 24. | 10% NaHSO$_4$-H$_2$O with 20% Na$_2$SO$_4$ (based on NaHSO$_4$-H$_2$O) | 19 ppm Cu |
| 25. | 10% NaHSO$_4$-H$_2$O with 30% Na$_2$SO$_4$ (based on NaHSO$_4$-H$_2$O) | 24 ppm Cu |

Decantation of the aqueous bisulfate-copper-amine extract improved with increased amounts of added sodium sulfate.

EXAMPLE VII

This example demonstrates that extraction of copper and amine catalyst residues from polyphenylene ethers can be conducted in a continuous manner. A large scale solution of poly(2,6-dimethyl-1,4-phenylene ether) prepared as in Example I was contacted with aqueous 10% NaHSO$_4$ solution by pumping both into a Kenics static mixer, with the flow rate of polymer solution at 3 liters/min. and the flow rate of bisulfate solution at 555 ml/min. This gave a molar ratio of bisulfate to dibutylamine and copper of 1.5:1. After contacting the mixture of solutions was pumped continuously into a 6 foot × 4 inches diameter Mixco extraction column containing ten stages, with the flow rate adjusted to 1.5 liters/min. The column was agitated in each stage with a stirrer rotating at 180 ppm. Water was also added to the extraction column at the top at a rate of 270 ml/min. After passing through the column the two phase mixture was separated by centrifugation and the polymer precipitated with methanol to give a product containing only 25 ppm copper.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. In a process for forming a polyphenylene ether by an oxidative coupling reaction in the presence of a complex copper-amine catalyst comprising passing an oxygen-containing gas through an organic reaction solution of a phenol and said catalyst, the improvement which comprises separating said catalyst by contacting the reaction solution with a sufficient quantity of an aqueous solution of a water soluble bisulfate salt so that a molar ratio of the bisulfate salt to the amine component of the catalyst of from 1:1 to 10:1 is employed and thereafter separating the organic reaction phase from the aqueous bisulfate phase that contains the extracted catalyst.

2. A process as defined in claim 1 wherein said polyphenylene ether is selected from the formula:

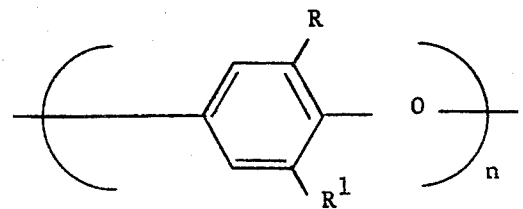

wherein the oxygen ether atom of one unit is connected to the benzene nucleus of the next adjoining unit, n is an integer of at least 50; and R and R$^1$ are monovalent substituents selected from hydrogen, halogen, hydrocarbon radicals, halohydrocarbon radicals having at least two carbon atoms between the halogen atom and the phenyl nucleus, hydrocarbonoxy and halohydrocarbonoxy radicals having at least two carbon atoms between the halogen atom and the phenyl nucleus.

3. A process as defined in claim 2 wherein said polyphenylene ether is poly(2,6-dimethyl-1,4-phenylene ether).

4. A process as defined in claim 2 wherein said copper amine complex catalyst includes dibutyl amine.

5. A process as defined in claim 2 wherein said water soluble bisulfate salt is a salt of an alkali metal.

6. A process as defined in claim 2 wherein said water soluble bisulfate salt is magnesium bisulfate.

7. A process as defined in claim 2 wherein said water soluble bisulfate salt is ammonium bisulfate.

8. A process as defined in claim 5 wherein said water soluble bisulfate salt is sodium bisulfate.

9. A process as defined in claim 1 wherein said aqueous solution of a water soluble bisulfate salt has a concentration of from 1 to 20% w/w of the water soluble bisulfate salt.

10. In a process for forming a polyphenylene ether by an oxidative coupling reaction in the presence of a copper-amine catalyst comprising passing an oxygen-containing gas through a reaction solution containing 2,6-xylenol and said catalyst, the improvement which comprises contacting the reaction solution with a 1:1 to 10:1 molar ratio of a 1% w/w to a saturated aqueous solution of sodium bisulfate as based on the amine component of the catalyst to extract said catalyst; separating the aqueous solution of the sodium bisulfate and said catalyst from the reaction solution by phase separation; and thereafter recovering the poly(2,6-dimethyl-1,4-phenylene ether) by adding an antisolvent for the poly(2,6-dimethyl-1,4-phenylene ether) to the reaction solution.

11. A process as defined in claim 10 wherein the reaction solution contains toluene and the antisolvent is methanol.

* * * * *